(12) United States Patent
Schultz et al.

(10) Patent No.: US 8,434,680 B1
(45) Date of Patent: May 7, 2013

(54) TRANSACTION PRODUCT WITH REMOVABLE TRANSACTION CARD

(75) Inventors: Mark A. Schultz, Prior Lake, MN (US); Meg Leszko, Maple Grove, MN (US); Jesse Gadola, Minneapolis, MN (US); Ted C. Halbur, Lino Lakes, MN (US); Maggie Harn, Minneapolis, MN (US); Brian R. Holt, Minneapolis, MN (US); Jared P. Kreuzer, Minneapolis, MN (US); Aaron Muther, Crystal, MN (US); Timothy P. Clegg, Manhatten Beach, CA (US); Anthony V. Roberts, Rolling Hills Estates, CA (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 13/290,044

(22) Filed: Nov. 4, 2011

(51) Int. Cl.
*G06K 19/00* (2006.01)
(52) U.S. Cl.
USPC ...................... 235/380; 235/375; 235/462.01
(58) Field of Classification Search .................. 235/375, 235/379, 380, 435, 439, 451, 454, 462, 487, 235/492; 340/10, 572
See application file for complete search history.

(56) References Cited

U.S. PATENT DOCUMENTS

| | | | |
|---|---|---|---|
| 761,461 A | 5/1904 | Eigen | |
| 2,055,305 A | 9/1936 | Pleasants, Jr | |
| 2,305,195 A | 12/1942 | Richter | |
| 3,380,575 A | 4/1968 | Hennessey | |
| 3,537,195 A | 8/1968 | Gerds | |
| 3,415,407 A | 12/1968 | Alden et al. | |
| 3,434,414 A | 3/1969 | Wright | |
| 3,583,317 A | 6/1971 | Gibson | |
| 3,679,047 A | 7/1972 | Papirnyik | |
| 4,643,301 A | 2/1987 | Hehn et al. | |
| D337,656 S | 7/1993 | Hostert | |
| 5,326,964 A | 7/1994 | Risser | |
| 5,718,336 A | 2/1998 | Haarlander | |
| 5,740,624 A | 4/1998 | Baseley | |
| 5,860,589 A | 1/1999 | Hsu | |
| D439,042 S | 3/2001 | Lau | |
| 6,240,989 B1 | 6/2001 | Masoud | |
| 6,659,271 B2 | 12/2003 | Parsons | |
| 7,032,817 B2 | 4/2006 | Blank | |
| 7,275,642 B2 | 10/2007 | Yuhara | |

(Continued)

OTHER PUBLICATIONS

Photographs of Best Buy Musical and Light-Up Gift Card Keeper, publicly offered for sale in Best Buy stores at least as early as Dec. 17, 2007 (1 page).

(Continued)

*Primary Examiner* — Michael G Lee
*Assistant Examiner* — Matthew Mikels
(74) *Attorney, Agent, or Firm* — Griffiths & Seaton PLLC

(57) ABSTRACT

A transaction product includes a housing and a transaction card. The housing defines a storage chamber and a substantially planar surface. The substantially planar surface defines a perimeter portion and a recessed portion surrounded by, spaced from, and extending substantially parallel to the recessed portion to define a recess. The housing includes opposing tabs extending from the perimeter portion, toward each other, and partially across the recessed portion. The transaction card includes a machine-readable account identifier linking the transaction card to an account or record remote from the transaction product and having a value available for use as payment toward a purchase. The transaction card defines two opposing edges each selectively secured between the recessed portion of the substantially planar surface and a different one of the opposing tabs.

25 Claims, 12 Drawing Sheets

U.S. PATENT DOCUMENTS

| | | | |
|---|---|---|---|
| 7,299,919 | B1 | 11/2007 | Eliassof |
| 7,316,357 | B2 | 1/2008 | Lindahl et al. |
| 7,322,519 | B2 | 1/2008 | Blank et al. |
| 7,360,710 | B2 | 4/2008 | Lindahl et al. |
| 7,395,623 | B2 | 7/2008 | Park et al. |
| 7,520,425 | B2 | 4/2009 | Clegg |
| 7,591,418 | B2 | 9/2009 | Halbur et al. |
| 7,617,928 | B1 | 11/2009 | Murphy |
| 7,634,895 | B2 | 12/2009 | Chan |
| 7,748,607 | B2 | 7/2010 | Borkowski et al. |
| 7,789,297 | B2 | 9/2010 | Birkeland et al. |
| 7,810,719 | B2 | 10/2010 | Clegg et al. |
| 7,828,138 | B2 | 11/2010 | Stukenkemper |
| 7,883,004 | B2 | 2/2011 | Halbur et al. |
| 7,905,038 | B2 | 3/2011 | Coff |
| 7,959,068 | B2 | 6/2011 | Halbur et al. |
| 8,091,781 | B2 | 1/2012 | Albrecht et al. |
| 2006/0208062 | A1* | 9/2006 | Osborn et al. ............. 235/380 |
| 2007/0194128 | A1 | 8/2007 | Coe et al. |
| 2008/0245875 | A1 | 10/2008 | Holt et al. |
| 2008/0296180 | A1 | 12/2008 | Stukenkemper |
| 2009/0140042 | A1 | 6/2009 | Clegg |
| 2009/0166436 | A1* | 7/2009 | Haugen et al. ............. 235/494 |
| 2009/0308920 | A1 | 12/2009 | Holt et al. |
| 2010/0320100 | A1 | 12/2010 | Holden |
| 2011/0161187 | A1 | 6/2011 | Albrecht et al. |

OTHER PUBLICATIONS

Photographs of Lego® GiftCard, first publicly offered for sale in Target stores Nov. 7, 2010 (3 pages).

"Peel-A-Deal® Bar Coded Card," http://www.peeladeal.com/products.php?code=pad_barcode&prod=Bar%20Coded%20Card, available at least as early as Aug. 27, 2009 (3 pages).

"GO-Tag™ Solution," firstdata.com, 2008 (2 pages).

"Contactless Payments: Consumer Trends and Usage Preferences," firstdata.com, 2008 (2 pages).

Office Action from Canadian Patent Application No. 2,772,647, mailed Oct. 9, 2012 (3 pages).

* cited by examiner

TRANSACTION PRODUCT WITH REMOVABLE TRANSACTION CARD

BACKGROUND OF THE INVENTION

Stored-value cards and other transaction cards come in many forms. A gift card, for example, is a type of stored-value card that includes a pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction cards provide a number of advantages to both the consumer and the retailer.

SUMMARY OF THE INVENTION

One aspect of the present invention relates to a transaction product including a housing and a transaction card. The housing defines a storage chamber and a substantially planar surface. The substantially planar surface defines a perimeter portion and a recessed portion surrounded by, spaced from, and extending substantially parallel to the recessed portion to define a recess. The housing includes opposing tabs extending from the perimeter portion, toward each other, and partially across the recessed portion. The transaction card includes a machine-readable account identifier linking the transaction card to an account or record remote from the transaction product and having a value available for use as payment toward a purchase. The transaction card defines two opposing edges each selectively secured between the recessed portion of the substantially planar surface and a different one of the opposing tabs.

Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

Figure 1:
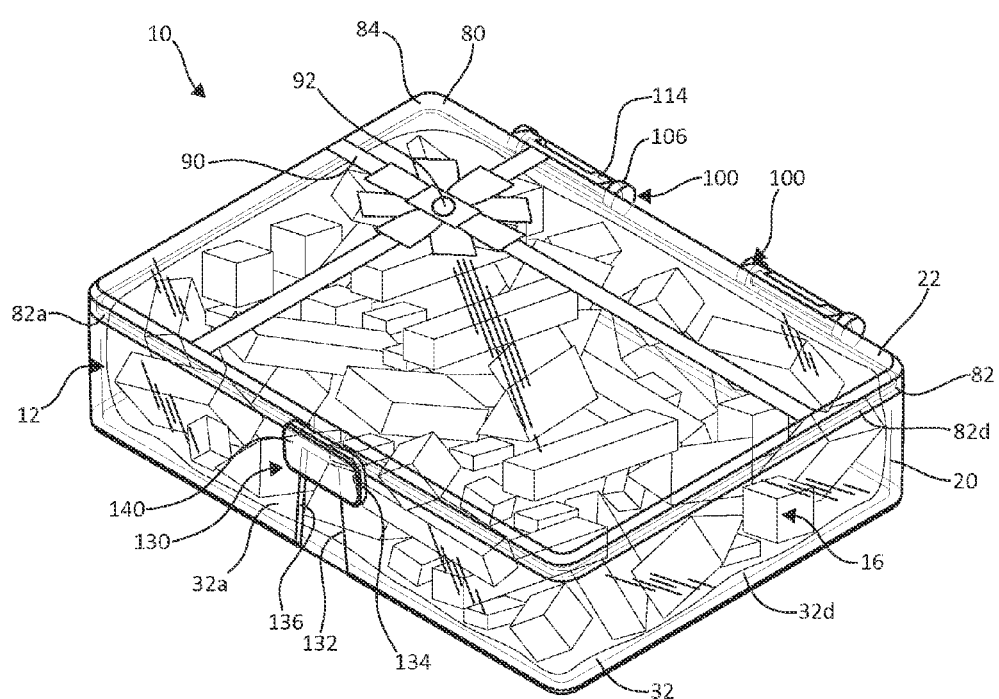
FIG. 1 is a top, front perspective view illustration of a transaction product, according to one embodiment of the present invention.

The following detailed description merely provides examples of the invention and is not intended to limit the invention or the application and uses of the invention. Furthermore, there is no intention to be bound by any theory presented in the preceding background of the invention or the following detailed description of the invention.

A gift card or other transaction product is adapted for making purchases of goods and/or services from e.g., a retail store or website. According to one embodiment, an original consumer buys the transaction product to give a recipient who in turn is able to use the transaction product at a retail store or setting to pay for goods and/or services. The transaction product, according to embodiments of the present invention, provides the consumer and recipient with extra functionality in addition to the ability to pay for goods and/or services with the transaction product. In particular, the transaction product presents the original consumer and/or other bearer of the transaction product with a reusable housing and/or with functional articles removably maintained therein.

More specifically, in one example, the transaction product includes a housing configured to selectively open and close to allow access to a storage chamber defined therein. The housing includes a cover and a base that, in one embodiment, are hingedly coupled to one another to allow for repeated opening and closing of the housing. In one embodiment, functional articles, such as building blocks, interlocking building bricks, play sets, tools, other toys, costume items, etc., are maintained within the housing. For instance, a pack of interlocking building bricks are included in the housing of the transaction product. In view of the above, transaction products according to embodiments described above provide bearers of the transaction products with non-transactional functionality such as a storage compartment and additional objects maintained therein. This non-transaction functionality of the transaction product generally promotes purchase and reloading of the transaction product.

In addition, in one embodiment, the transaction product includes a transaction card formed separately from and readily couplable and uncouplable from the housing. In one example, the transaction card includes all information necessary to function as a form of tender during a purchase transaction, etc. As such, a bearer may use the transaction product with the transaction card or use the transaction card alone as payment toward a purchase, etc. In one embodiment, the removable transaction card is sized to easily fit in a wallet of a bearer unlike the housing of the transaction product.

Turning to the figures, FIGS. 1-12 illustrate one embodiment of a transaction product 10 such as a stored-value product (e.g., gift product, phone product, etc.), credit product, transaction assembly, etc. according to the present invention. All or a portion of transaction product 10 is configured to be used toward the purchase and/or use of goods and/or services and includes a casing or housing 12, a removable transaction card 14, and one or more articles 16 stored therein. The one or more articles 16 are configured to be repeatedly stored in and removed from housing 12.

In one embodiment, housing 12 includes a first housing member, for example, a base 20, and a second housing member, for example, a cover 22. In one example, base 20 and cover 22 are movably or selectively coupled with one another such that the one or more articles 16 stored therein can be selectively accessed for removal from housing 12 or placement back into housing 12. In one example, base 20 and cover 22 are hingedly coupled to one another such that cover 22 rotates relative to base 20 to selectively open and close housing 12 to selectively provide access to the one or more articles 16. In another embodiment (not illustrated), base 20 and cover 22 are slidably coupled with one another such that cover 22 can be repeatedly slid onto base 20 to couple cover 22 to base 20 and slid at least partially off of base 20 to allow access to the one or more articles 16 stored within housing 12.

Figure 9:
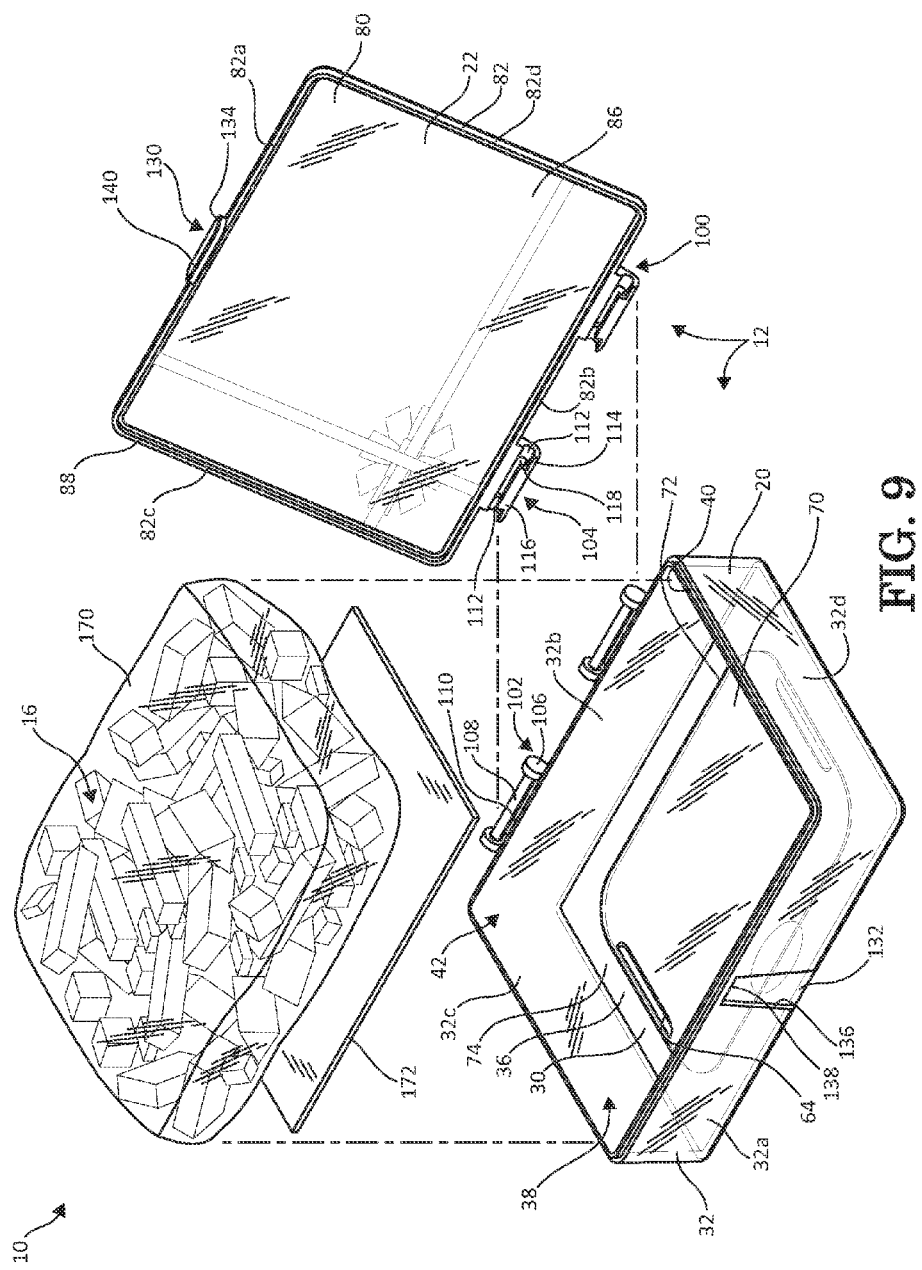
FIG. 9 is a top, front perspective view illustration of a partially exploded version of the transaction product of FIG. 1, according to one embodiment of the present invention.
Figure 11:
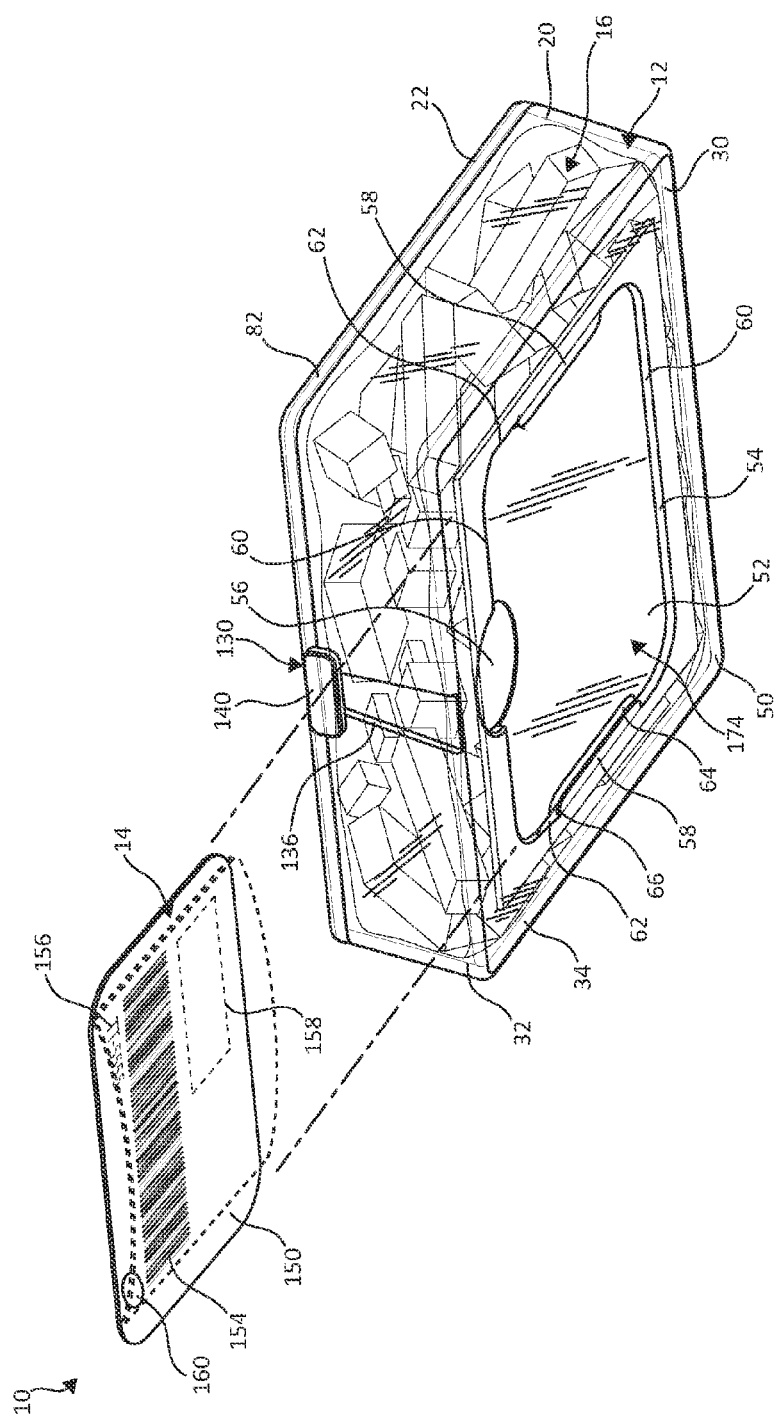
FIG. 11 is a bottom, front perspective view illustration of a partially exploded version of the product of FIG. 1, according to one embodiment of the present invention.

In one embodiment, base 20, as described with primary reference to FIGS. 9 and 11, generally includes a bottom panel or bottom wall 30 and a side panel or sidewall 32 extending substantially entirely around bottom wall 30. Bottom wall 30 defines an external surface 34 (e.g., FIGS. 2, 4, and 11) and an internal surface 36 (FIG. 9) opposite external surface 34. In one embodiment, bottom wall 30 is generally rectangular in shape, and has, in one example, a length of about 4.6 inches and a width of about 3 inches; however other suitable dimensions are also contemplated. In other embodiments, bottom wall 30 is otherwise shaped as a square, circle, oval, star, or any other suitable shape.

Sidewall 32 extends from internal surface 36 further away from external surface 34 and, in one example, substantially about an entire outer perimeter of bottom wall 30 to define a compartment or storage chamber 38 (FIGS. 6 and 8) therebetween. In one embodiment, sidewall 32 extends with a substantially perpendicular orientation relative to bottom wall 30. Where bottom wall 30 is substantially square or rectangular, sidewall 32 includes a plurality of substantially linear segments 32a, 32b, 32c, and 32d. More particularly, first or front substantially linear segment 32a is positioned opposite and extends substantially parallel to second or rear substantially linear segment 32b. Third and fourth or side substantially linear segments 32c and 32d are positioned opposite and extend substantially parallel to one another between opposing ends of front substantially linear segment 32a and second substantially linear segment 32b. Other shapes and configurations of base 20 are contemplated.

In one embodiment, sidewall 32 is curved or chamfered around each corner, if any, defined by sidewall 32. Sidewall 32 extends from bottom wall 30 to define an inside edge 40 opposite bottom wall 30. In one example, inside edge 40 is formed as a stepped edge and/or includes other suitable features to facilitate mating of base 30 with cover 32, as will be further described below, and defines an opening 42 to storage chamber 38. In one embodiment, each sidewall 32 has a height of about one inch; however, other suitable dimensions are also contemplated.

In one embodiment, external surface 34 of bottom wall 30 includes a frame or perimeter portion 50 and an inset or recessed portion 52. Perimeter portion 50 extends from sidewall 32 radially inwardly and substantially surrounds recessed portion 52 such that recessed portion 52, in one example, is spaced entirely from sidewall 32 on all sides. Perimeter portion 38 and recessed portion 40 are each substantially planar and/or extend offset and substantially parallel to one another, according to one embodiment. For example, recessed portion 40 is inwardly offset or recessed (i.e., offset toward opening 42) from perimeter portion 50 to define a outside border or transitional edge 54 similar to a step extending between an outside perimeter of recessed portion 52 and an inside perimeter of perimeter portion 50. In one example, transitional edge 54 extends substantially perpendicular to perimeter portion 50 and/or recessed portion 52 to define outer boundaries of recess 174.

Recessed portion 52 is sized and shaped substantially similarly or slightly larger than outer dimensions of transaction card 14, which, in one embodiment, is sized similarly to a credit or debit card, for example in accordance with ISO/IEC 7810 standards for banking and similar cards. In one embodiment, recessed portion 52 includes a finger access section 44 that extends beyond an otherwise substantially linear edge of recessed portion 52. In one example, finger access section 44 is recessed inwardly from perimeter portion 50 as much or more than a remainder of recessed portion 52 to allow the bearer to slide her finger under transaction card 14 to remove transaction card 14 from housing 12 as will be further described below.

In one embodiment, bottom wall 30 has a substantially consistent thickness throughout including both perimeter portion 50 and recessed portion 52. As such and as illustrated, internal surface 36 defines an inset portion 70 formed opposite recessed portion 52 and as a result of the formation of recessed portion 52. Inset portion 70 is sized and positioned substantially similar to recessed portion 52 and defines an internal step or internal transitional border 72 extending between inset portion 70 and a remainder of internal surface 36, that is, a perimeter portion 74 of internal surface 36.

Figure 12:
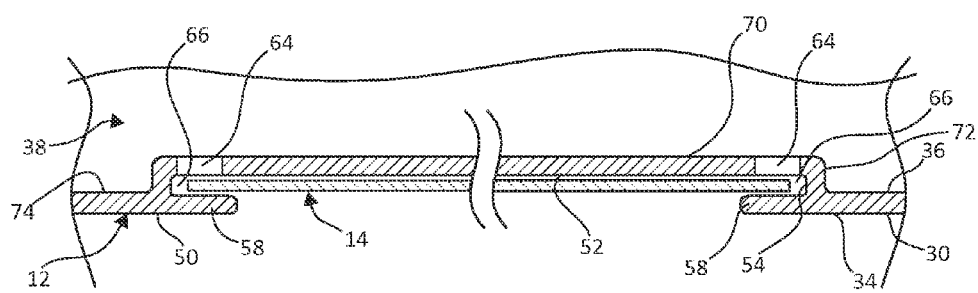
FIG. 12 is a partial, cross-sectional view illustration of the transaction product taken along the line Y-Y in FIG. 4, according to one embodiment of the present invention.

Housing 12, more particularly, bottom wall 30 includes flanges or tabs 58 positioned on opposite sides of recessed portion 52 extending toward, but not to, each other according to one embodiment. For example, where recessed portion 52 is substantially rectangular, recessed portion 52 defines two opposing long edges 60 and two opposing short edges 62. In one embodiment, finger access section 44 extends from one of the two opposing long edges 60 and one of tabs 58 extends from transitional edge 54 and over each opposing short edge 62. In one embodiment, each tab 58 has a length of at least about half of a length of the respective one of two opposing long edges 60 or one of two opposing short edges 62 that each tab 58 extends over. As illustrated in FIGS. 11 and 12, each tab 58 extends over and is spaced from recessed portion 52 to define a slot 66 therebetween having a thickness (i.e., distance between recessed portion 52 and the respective tab 58) substantially equal a thickness of transaction card 14. In one embodiment, an aperture 64 is formed through recessed portion 52 just below and is shaped similarly to each of tabs 58.

In one embodiment, base 20 is entirely or at least partially transparent or translucent such that the one or more items 16 are viewable through base 20 when transaction product 10 is assembled. Base 20 is formed of any suitable material, for example, a metallic material (e.g., tin, steel or aluminum), an injection molded plastic material (e.g., polycarbonate, polystyrene, polyvinyl chloride (PVC), acrylonitrile butadiene styrene (ABS), acrylonitrile styrene, polyethylene terephthalate (PET), teslin, polyactide (PLA) or acrylic) or any other suitable material to define the various attributes of base 20.

Figure 3:
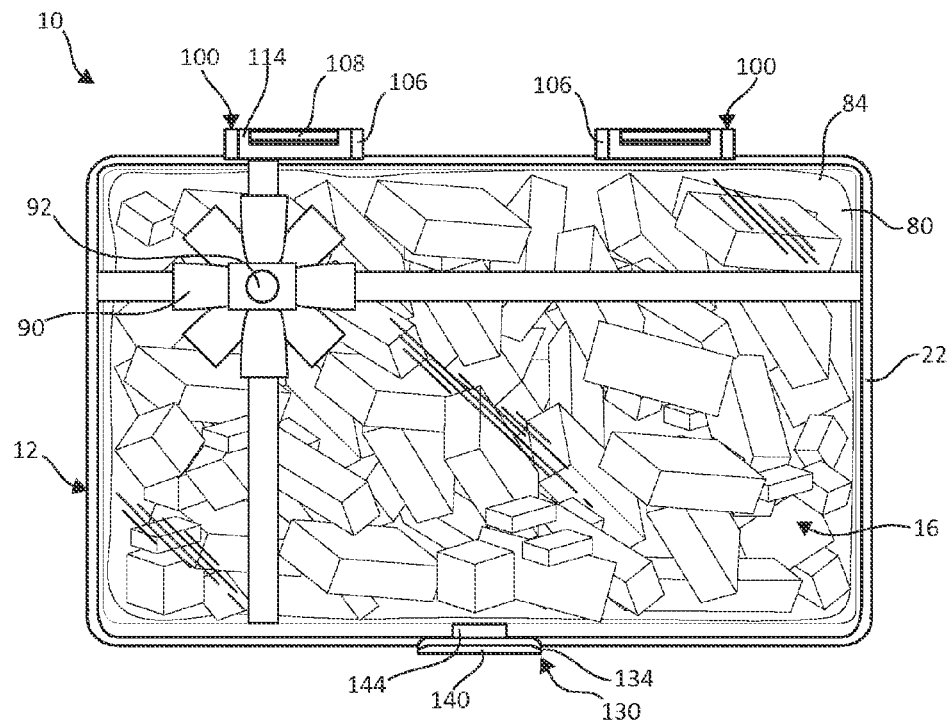
FIG. 3 is a top view illustration of the transaction product of FIG. 1, according to one embodiment of the present invention.
Figure 4:
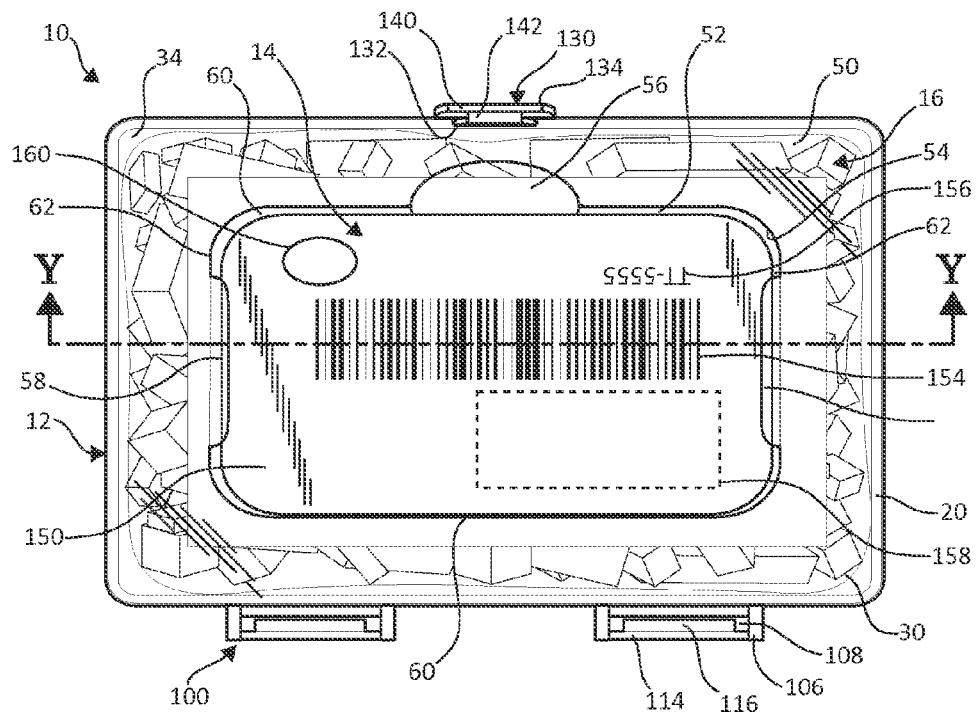
FIG. 4 is a bottom view illustration of the transaction product of FIG. 1, according to one embodiment of the present invention.
Figure 5:
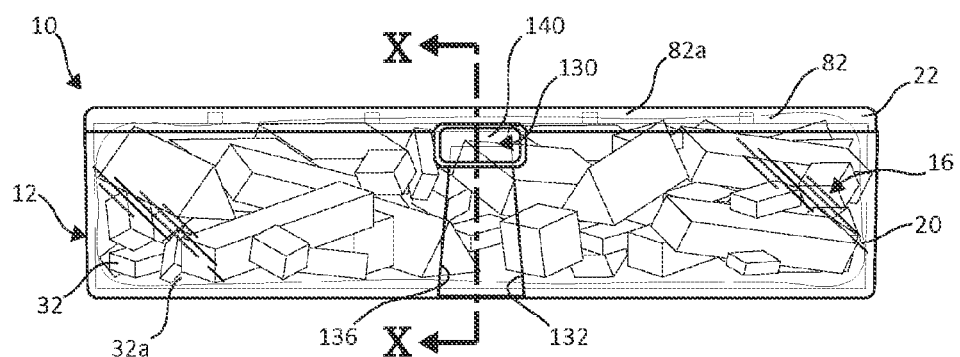
FIG. 5 is a front view illustration of the transaction product of FIG. 1, according to one embodiment of the present invention.
Figure 6:
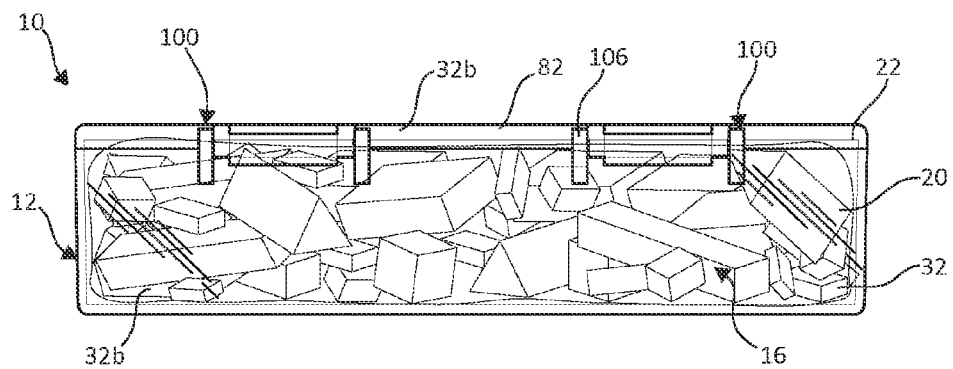
FIG. 6 is a rear view illustration of the transaction product of FIG. 1, according to one embodiment of the present invention.
Figure 7:
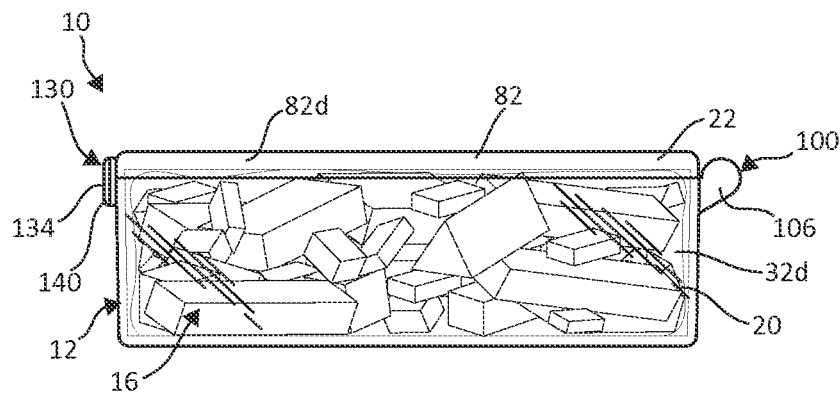
FIG. 7 is a right side view illustration of the transaction product of FIG. 1, according to one embodiment of the present invention.
Figure 8:
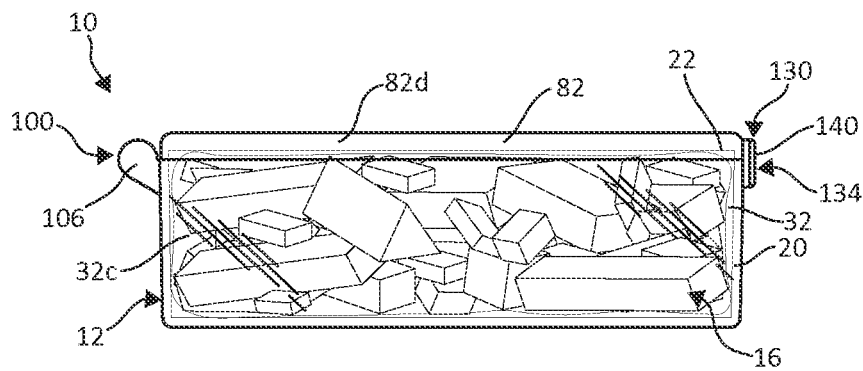
FIG. 8 is a left side view illustration of the transaction product of FIG. 1, according to one embodiment of the present invention.

In one embodiment, cover 22, as described with primary reference to FIGS. 1, 3, and 9, generally includes a bottom panel or top wall 80 and a side panel or sidewall 82 extending substantially entirely around top wall 80. Top wall 80 defines an external surface 84 (e.g., FIGS. 1 and 3) and an internal surface 86 (FIG. 9) opposite external surface 84. In one embodiment, top wall 80 is sized and shaped substantially identically to bottom wall 30 of base 20. For example, top wall 80 is substantially rectangular in shape, and has, in one example, a length of about 4.6 inches and a width of about 3 inches; however other suitable dimensions are also contemplated. In other embodiments, top wall 80 is otherwise shaped as a square, circle, oval, star, or any other suitable shape.

Sidewall 82 extends from internal surface 86 further away from external surface 84 and, in one example, substantially about an entire outer perimeter of top wall 80. In one embodiment, sidewall 82 extends with a substantially perpendicular orientation relative to top wall 80 and/or is substantially shorter than sidewall 32. Where top wall 80 is substantially square or rectangular, sidewall 82 includes a plurality of substantially linear segments 82a, 82b, 82c, and 82d. More particularly, first or front substantially linear segment 82a is positioned opposite and extends substantially parallel to second or rear substantially linear segment 82b. Third and fourth or side substantially linear segments 82c and 82d are positioned opposite and extend substantially parallel to one another between opposing ends of front substantially linear segment 82a and second substantially linear segment 82b.

In one embodiment, sidewall 82 is curved or chamfered around each corner, if any, defined by sidewall 82. Sidewall 82 extends from top wall 80 to define an inside edge 88 opposite top wall 80. In one example, inside edge 88 is formed as a stepped edge and/or includes other suitable features to facilitate mating of base 30 with cover 32 (e.g., for mating with inside edge 40 of base 20) as will be further described. In one embodiment, each sidewall 82 has a height of less than about a quarter inch; however, other suitable dimensions are also contemplated.

Cover 22 is formed of any suitable material, for example, a metallic material (e.g., tin, steel or aluminum), an injection molded plastic material (e.g., polycarbonate, polystyrene, polyvinyl chloride (PVC), acrylonitrile butadiene styrene (ABS), acrylonitrile styrene, polyethylene terephthalate (PET), teslin, polyactide (PLA) or acrylic) or any other suitable material to define the various attributes of cover 22.

In one embodiment, where base 20 and cover 22 are hingedly coupled to one another, base 20 and cover 22 define a first hinge portion 102 and a second hinge portion 104, respectively, a hinge 68. Referring primarily to the exploded view of FIG. 9, in one example, first hinge portion 102 and second hinge portion 104 extend from rear substantially linear segments 32b and 82b of base 20 and cover 22, respectively. First hinge portion 102 includes a pair of end supports 106 extending outwardly, e.g., rearwardly away from storage chamber 38, and a support rod or axle 108 laterally extending between each end support in the pair of end supports 106. Axle 108 is spaced from sidewall 32 to define a gap 120 therebetween.

Second hinge portion 104, in one embodiment, includes a pair of side supports 112 extending outwardly, e.g., rearwardly away from a remainder of cover 22, a curved intermediate portion 114 extending between the pair of side supports 112, and an extension tab 116 also curved and extending from curved intermediate portion 114 opposite sidewall 82. Substantially all of second hinge portion 104 is sized to fit between the pair of end supports 106 of first hinge portion 102. Curved intermediate portion 114 and extension tab 116 are curved and define a rounded surface and associated cavity (not shown) to receive axle 108 therein in a manner allowing second hinge portion 104 to selectively rotate about axle 108. In one embodiment, an aperture 118 is defined between the pair of side supports 112 to save material, and to allow second hinge portion 104 to more easily deflect to fit over axle 108 when second hinge portion 104 is forced against axle 108 during assembly of housing 12. In one embodiment, housing 12 includes two hinges 100 spaced laterally from one another along rear substantially linear segments 32b and 82b of base 20 and cover 22. Other numbers of hinges 100 are also contemplated. Although described as base 20 including first hinge portion 102, and cover 22 including second hinge portion 104, in other embodiments, base 20 includes second hinge portion 104, and cover 22 includes first hinge portion 102.

To selectively maintain housing 12 in a closed position, in one embodiment, housing 122 includes a latch 130 opposite hinge 100. For example, latch 130 includes a first latch portion 132 formed in first substantially linear segment 32a of base 20 and a second latch portion 134 formed in and/or extending from first substantially linear segment 82a of cover 22. First latch portion 132 includes an indentation 136 in sidewall 32 to form an exposed edge 138 at the upper boundary of indentation 136. Second latch portion 134 includes a primary protruding member 140 coupled to and extending from first substantially linear segment 82a near inside edge 88 of sidewall 82 and a tab or clasp 142 extending from primary protruding member 140. Primary protruding member 140 extends downwardly beyond inside edge 88 of cover 22 (i.e., extends further away from top wall 80 than sidewall 82). At an end of primary protruding member 140 opposite top wall 80, clasp 142, for example, in the form of a ramped segment, extends inwardly (i.e., toward second substantially linear segment 82b of cover 22).

Figure 10:
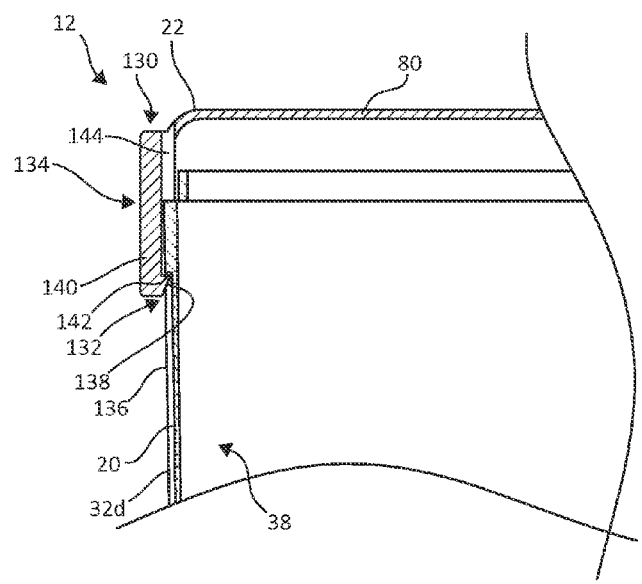
FIG. 10 is a partial, cross-sectional view illustration of the transaction product taken along the line X-X in FIG. 5, according to one embodiment of the present invention.

As illustrated with additional references to the partial cross sectional view of FIG. 10 (notably, the one or more articles 16 are excluded from FIG. 10 for clarity), clasp 142 is configured to interact and grasp exposed edge 138 of first latch portion 132 to selectively hold cover 22 in place relative to base 20 to decrease inadvertent opening of housing 12, while still allowing opening of housing 12 about hinge 100 when a suitable, hand force is applied to cover 22 to release latch 130 and rotate cover 22 away from opening 42 of base 20. Although housing 12 is illustrated and described with base 20 including first latch portion 132 and cover 22 including second latch portion 134, it should be understood that in other embodiments, base 20 includes second latch portion 134 and cover 22 includes first latch portion 132.

Transaction card 14 is configured to be used as tender applied toward a price of a retail or other suitable purchase or transaction. In one example, transaction card 14 is a stored-value, credit, debit, or other suitable transaction card of a substantially planar form defining an exposed substantially planar surface 150 and an opposite substantially planar surface (not shown). In one embodiment, exposed substantially planar surface 150 includes an account identifier 154 (see, e.g., FIGS. 2 and 3) such as a bar code, magnetic strip, a smart chip or other electronic device, a radio frequency identification (RFID) device or other suitable identifier readily machine readable by a point-of-sale terminal or other account access station or kiosk. Account identifier 154 indicates an account or record to which transaction card 14, and therefore, transaction product 10, is linked. The account or record of the monetary or other balance on transaction card 14 optionally is maintained on a database, other electronic or manual record-keeping system or, in the case of "smart" cards for example, on a chip or other electronic devices on transaction card 14 itself. Accordingly, by scanning account identifier 154, the account or record linked to transaction card 14 is identified and can subsequently be activated, have amounts debited therefrom and/or have amounts added thereto.

In one embodiment, account identifier 154 includes a character string or code 156 (e.g., a number and/or letter string) configured to provide additional security to the user of transaction card 14 and/or configured to be read by a bearer of transaction card 14 to facilitate use of transaction card 14 for web site or other purchases outside of brick-and-mortar type retail establishments. With the above in mind, account identifier 154 is one example of means for linking transaction card 14, and therefore, transaction product 10, with an account or record, and scanning of account identifier 154 is one example of means for activating or loading value on transaction card 14. In one example, an second account identifier (not shown) is included on housing 12 that is, for instance, identical to account identifier 154 such that either housing 12 or transaction card 14 can be used as tender in a financial transaction.

Figure 2:
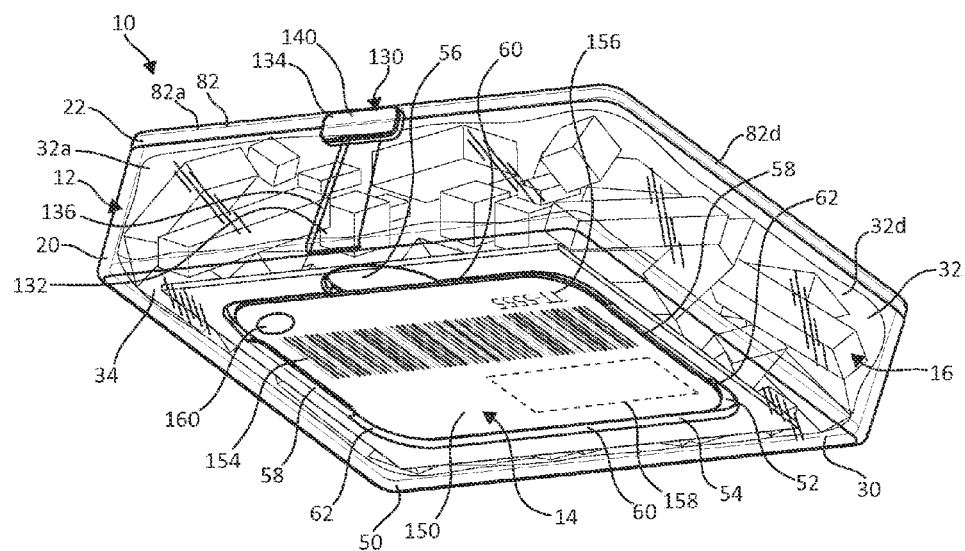
FIG. 2 is a bottom, front perspective view illustration of the transaction product of FIG. 1, according to one embodiment of the present invention.

In one embodiment, transaction card 14 additionally includes redemption indicia 158, which are generally indicated with a dashed line box in FIGS. 2 and 3, for example, on exposed surface 150. Redemption indicia 158 indicate that transaction card 14 is redeemable for the purchase of goods and/or services and that, upon use, a value of the purchased goods and/or services will be deducted from the financial account or record linked to transaction card 14. In one embodiment, redemption indicia 158 include phrases such as "<NAME OF STORE> GiftCard" and "This GiftCard is redeemable for merchandise or services at any of our stores or at our web site," and/or provides help or phone line information in case of a lost, stolen or damaged transaction product, etc. In one embodiment, redemption indicia 158 and one or more of any other indicia or information on transaction card 14 are printed on housing 12.

In one embodiment, brand indicia 160, which identify a brand associated with transaction card 14 and transaction product 10 as a whole such as identifying a product brand, a store brand, department, etc. are also included on one or both of exposed surface 150 and the opposing surface (not shown) of transaction card 14. Any other suitable indicia may be included on housing 12 as will be apparent to those of skill in the art upon reading this application.

In one embodiment, transaction card 14 is selectively maintained by housing 12, for example, within recess 174 (FIG. 11) defined immediately adjacent recessed portion 52 of outer surface 24 of base, held between tabs 58 and recessed portion 52 at two opposing edges, e.g., two opposing short edges. As such, transaction card 14 and recessed portion 52 are substantially similar in size and shape. To place transaction card 14 in recess 174, in one example, an edge or transaction card 14 is placed under one of tabs 58 and transaction card 14 is flexed as generally illustrated in dashed lines in FIG. 11 to a shorter length and aligned with the other one of tabs 58. Once so aligned, transaction card 14 is unflexed and the opposing edge of transaction card 14 to slide between the other one of tabs 58 and recessed portion 52 (see, e.g., the partial cross-sectional view of FIG. 12). In one example, since transitional edge extends closely around an entire perimeter of recess 174, transaction card 14 can only be placed into recess 174 and below opposing tabs 58 by flexing transaction card 14. To remove transaction card 14 from recess 174, one places her finger within extending indentation 56 to contact and push downwardly on the opposing or internal surface (not shown) of transaction card 14, flexing transaction card 14 for removal from tabs 58.

Referring to FIG. 9, one or more articles 16 may be any suitable article(s) 16 configured to be selectively stored within housing 12. In one embodiment, one or more articles 16 include interlocking building blocks or bricks, toys, utensils, stickers, accessories, or other suitable and generally desirable objects. In one example, the one or more articles 16 are a plurality of interlocking building blocks configured to be assembled into one or more different characters or objects, for instance, characters or objects associated with a retailer (e.g., a brand or store mascot) configured to accept transaction card 14 toward a purchase price of a transaction such that the one or more articles 16 serve as a form of advertisement for the retailer. In one example, the one or more articles 16 are one or more LEGO® brand bricks that can be built into larger constructions based on provided instructions and/or the user's imagination after transaction product 10 is received by the end user outside of a retail store, after transaction product 10 is used in it financial capacity, etc. simply by removing bricks from housing 12.

Referring to FIG. 9, transaction product 10, in one embodiment, includes a bag 170 or other container for holding the one or more articles 16 in a group and/or in a safe manner for placement into storage chamber 38. In one example, such as where the one or more articles 16 are a plurality of interlocking building bricks, a promotional or instructional sheet 172 is included in storage chamber 38. Instructional sheet 172 includes, in one embodiment, instructions for assembling the plurality of interlocking building bricks into one or more characters or objects in a manner that is one or both of entertaining and educational to a user.

Figure 13:
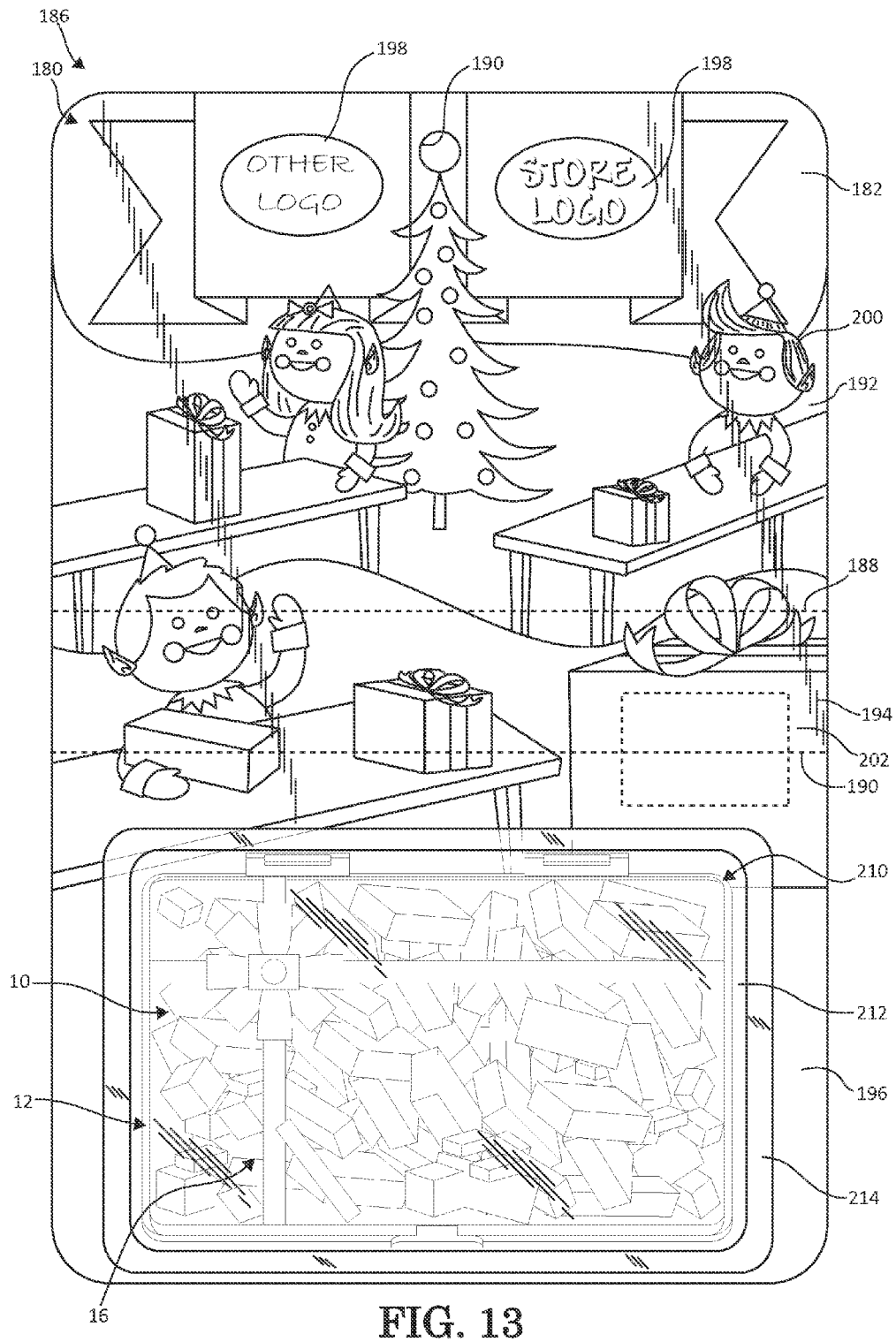
FIG. 13 is a top view illustration of a transaction product assembly including the transaction product of FIG. 1, a backer, and a blister pack, according to one embodiment of the present invention.
Figure 14:
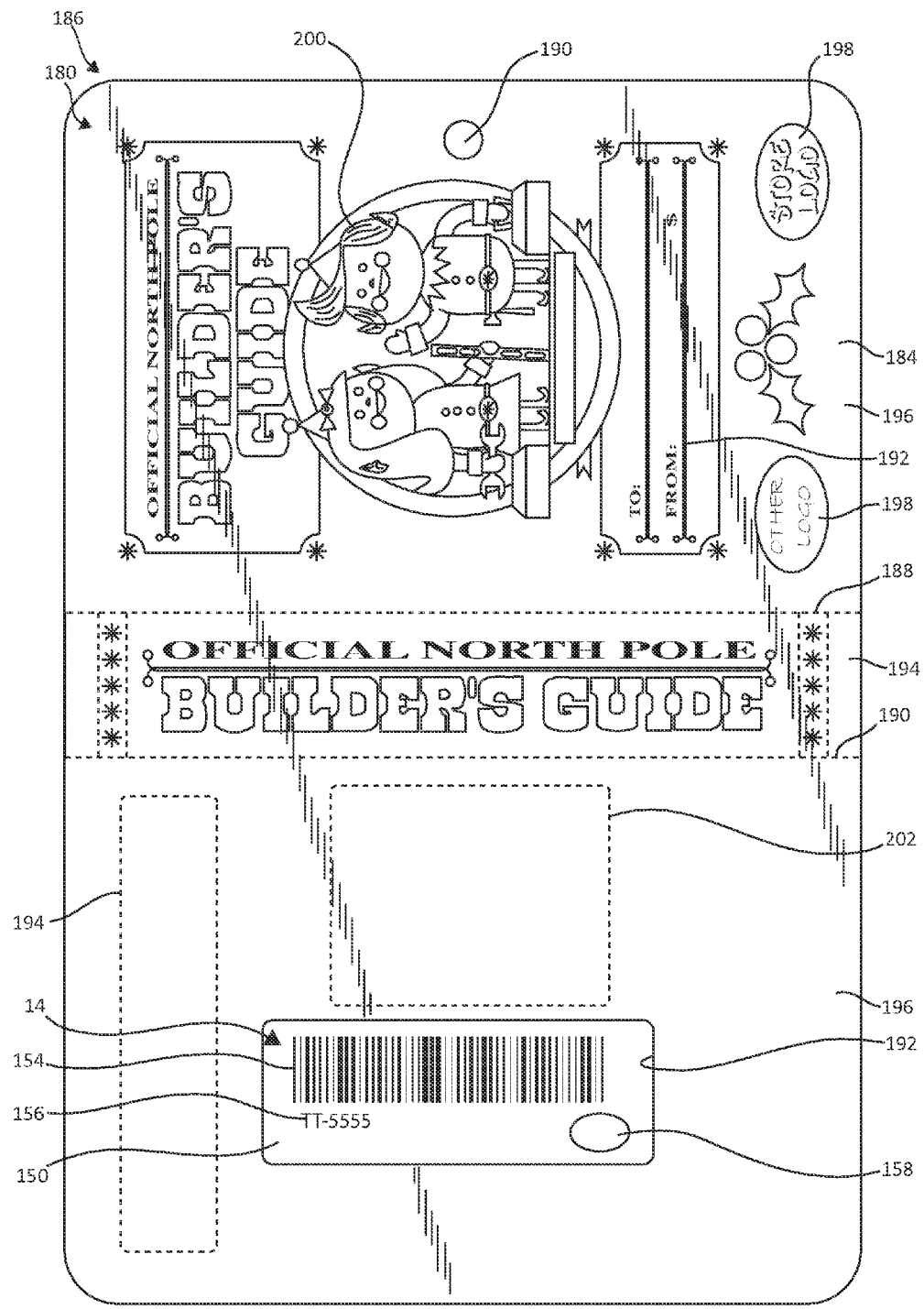
FIG. 14 is a bottom view illustration of the transaction product assembly of FIG. 13, according to one embodiment of the present invention.

FIGS. 13 and 14 illustrate a carrier or backer 180 supporting transaction product 10 (e.g., FIGS. 1-11). Backer 180 comprises a single layer or multiple layers of paper or plastic material, for example, generally in the form of a relatively stiff but bendable/flexible card. Use of other materials is also contemplated. As such, backer 180 defines a first or top surface 182 (FIG. 13) and a second or bottom surface 184 (FIG. 14). Transaction product 10, is readily releasably attached to backer 180, for example, by adhesive, blister packaging, overlying skinning material or the like, such that transaction product 10 with backer 180 collectively define a transaction product assembly 186. For example, a blister 210 defines a chamber-defining portion 212 for surrounding at least five sides of transaction product 10 and a frame portion 214 extending around an entire perimeter of an open side of chamber-defining portion 212. Transaction product 10 is placed in chamber-defining portion 212 and frame portion 214 is secured to top surface 182 of backer 180 such that transaction product 10 is maintained interposed between blister 210 and backer 180 for display and gifting purposes.

Fold lines 188 and 190 each extend laterally across backer 180 and are spaced longitudinally from one another. A first panel 192, a second or intermediate panel 194 and a third panel 188 are defined by the position of fold lines 188 and 190. First panel 192 extends from fold lines 188 away from fold line 190. Second or intermediate panel 194 extends between fold lines 188 and 190. Third panel 188 extends from fold lines 190 in a direction opposite fold lines 188 and, in one embodiment, supports transaction product 10 and is coupled to blister 210.

In one example, during display for sale, backer 180 remains in an unfolded position as illustrated in FIGS. 13 and 14. As such, an open (i.e., unfolded) backer 180 can be hung via a hanging aperture 190, which is formed through backer 180 on a support arm or hook for display by a retailer in a retail setting. In one embodiment, the bearer of transaction product assembly 186 can fold the front surfaces 182 of backer 180 toward each other about fold lines 188 and 190 to wrap backer 180 about transaction product 10, for example, for gifting to an end recipient to increase the anticipation of what is folded inside backer 180. Other suitable backers will be apparent to those of skill in that art upon reading this application and may or may not be configured to fold or wrap about transaction product 10.

In one embodiment, backer 180 includes a window or opening 192 for displaying account identifier 154 of transaction card 14 through backer 180 as illustrated in FIG. 10. As previously described, account identifier 154 is adapted for accessing an account or record associated with transaction product 10 for activating, loading or debiting value from the account or record. Accordingly, in one embodiment, opening 192 allows access to account identifier 154 to activate and/or load transaction product 10 without removing transaction product 10 from backer 180. In one example, opening 192 is defined on third panel 196 such that account identifier 154 can be accessed therethrough whether backer 180 is folded or unfolded.

In one embodiment, backer 180 displays indicia, graphics or text information including store logo(s), store name(s), slogans, advertising, instructions, directions, brand indicia, promotional information, holiday indicia, seasonal indicia, media format identifiers, characters and/or other information. The various indicia may be included on one or more of top surface 182 and bottom surface 184. In one example, the indicia include one or more of redemption indicia 194, message field indicia 196, brand indicia 198, decorative indicia 200, etc.

Redemption indicia 194, which are generally indicated with a dashed line box in FIG. 14, inform a bearer of transaction product assembly 186 that transaction product 10 is redeemable for the purchase of goods and/or services and that upon use, a value of the purchased goods and/or services will be deducted from the financial account or record linked to transaction product 10. In one embodiment, redemption indicia 194 include phrases such as "<NAME OF STORE> GiftCard" and "This GiftCard is redeemable for merchandise or services at any of our stores or at our website," and/or provides help or phone line information in case of a lost, stolen or damaged transaction product, etc.

Message field indicia 196 (FIG. 14), for example, include "to," "from" and "amount" fields and are configured to be written to by the bearer of transaction product assembly 186 prior to presenting transaction product assembly 186 to a recipient. As such, message field indicia 196 facilitate the consumer in preparing transaction product assembly 186 for gifting to a recipient.

Brand indicia 198 identify a store, brand, department, etc. and/or services associated with transaction product 10, and in one example, are similar to any brand indicia 92 of transaction product 10. In one embodiment, brand indicia 198 may indicate two or more brands such that transaction product assembly 186 is co-branded. Any decorative indicia 200, which may be similar to or coordinate with indicia 90 of transaction product 10 and/or with the one or more articles 16 maintained in housing 12, may also be included on backer 180.

In one embodiment, instructional indicia 202 are included on any one of backer 180 or transaction product 10. Instructional indicia 202 provide at least partial instructions of how to use the one or more articles 16 and/or promoting such use of the one or more articles in a manner promoting selection, activation, and loading of the associated transaction card 14. Any of indicia 194, 196, 198, 200, 202, or other indicia optionally may appear anywhere on backer 180 or transaction product 10. Additional information besides that specifically described and illustrated herein may also be included.

Figure 15:
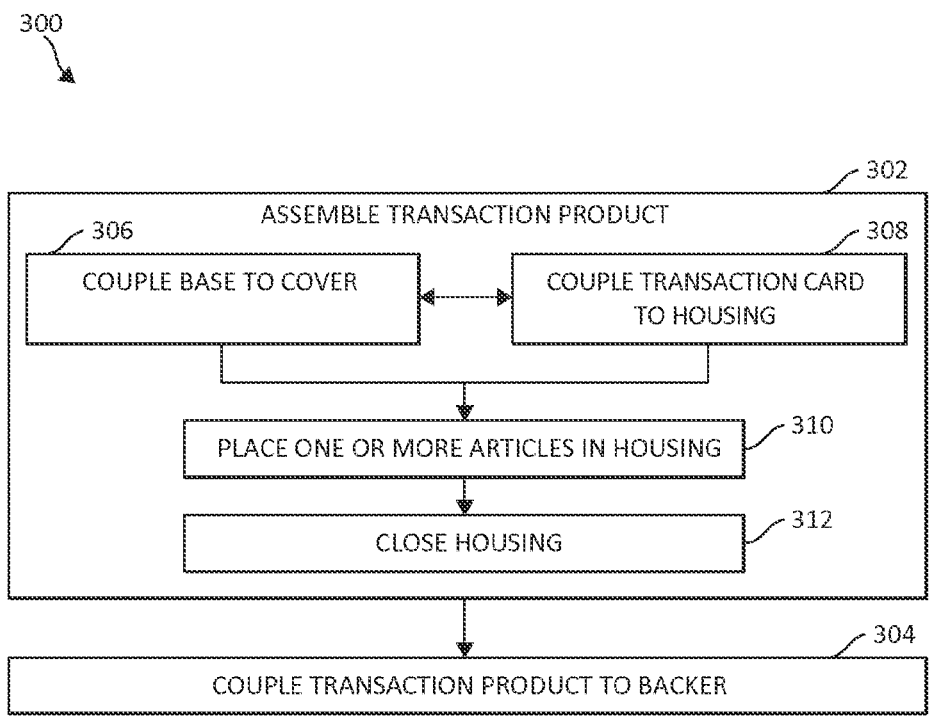
FIG. 15 is a flow chart illustrating a method of assembling a transaction product, according to one embodiment of the present invention.

FIG. 15 is a flow chart illustrating one embodiment of a method 300 of assembling transaction product assembly 186. More specifically, at 302, transaction product 10 is assembled, and at 304, transaction product 10 is coupled with backer 180. As part of transaction product 10 assembly 302, at 306, base 20 is coupled with cover 22. For example, second hinge portion 104 is pushed toward axle 108 of first hinge portion 102, deflects, and eventually receives and extends at least partially around axle 108 coupling one side of cover 22 to a corresponding side of base 20.

At 308, transaction card 14 is coupled with housing 12. For example, a first short edge of transaction card 14 is placed in recess 174 within one of slots 66 formed between recessed portion 52 and one of tabs 58. Transaction card 14 is then flexed to move the opposing short edge in recess 174 around the other one of tabs 58 and is released causing the opposing short edge of transaction card 14 to slide into the other slot 66. Once transaction card 14 is secured within each slot 66 by tabs 58, transaction card 14 is securely and removably maintained with in recess 174. Operations 306 and 308 may be performed sequentially, however the sequence may vary.

At 310, the one or more articles 16 are positioned in storage chamber 38 of housing 12. In one embodiment, the one or more articles 16 may be coupled to one another, for example with a bag 170, multiple bags, or other suitable wrapper(s) prior to placing the one or more articles 16 in storage chamber 38. As such, bag 170 with the one or more articles 16 are placed in storage chamber 38 alone or with other related items, such as, for example, instruction sheet 172. In one embodiment, the one or more articles 16 are placed in storage chamber 38 before base 20 is coupled with cover 22 at 306 as will be apparent to those of skill in the art upon reading this application.

Once the one or more articles 16 are positioned within storage chamber 38, then at 312, housing 12 is closed around the one or more articles 16. For example, cover 22 is rotated about axle 108 toward base 22 to cover opening 42 to storage chamber 38. Cover 22 is selectively secured to base 22 opposite hinge 100, for example, via latch 130. More specifically, in one embodiment, first latch portion 132 and second latch portion 134 are placed to interact with one another such that clasp 142 grasps upper edge 138 of indentation 136 to selectively hold housing 12 in a closed position around the one or more articles 16.

At 304, transaction product 10 is coupled with backer 180 as generally illustrated with additional reference to FIGS. 13 and 14 to form transaction product assembly 186. Transaction product 10 may be adhered, skinned to, blister packed with or otherwise suitably coupled with backer 180. In one embodiment, transaction product 10 is placed in blister 210 and blister frame 214 is secured to top surface 182 of backer 180.

In one example, transaction product 10 is placed relative to backer 180 in a manner aligning account identifier 154 of transaction product 10 with opening 192 in backer 180 such that account identifier 154 is accessible for scanning while transaction product 10 is coupled with backer 180, for example, through opening 192 in backer 180. In one example, blister 210 is translucent or transparent such that transaction product 10 is readily viewable through blister 210.

Figure 16:
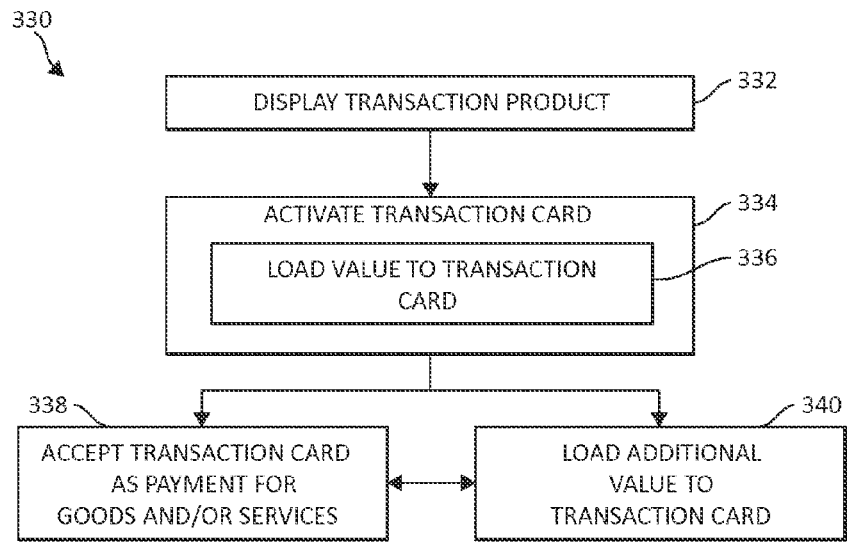
FIG. 16 is a flow chart illustrating a method of encouraging purchase and facilitating use of a transaction product, according to one embodiment of the present invention.

FIG. 16 is a flow chart illustrating one embodiment of a method 330 of encouraging purchase and facilitating use of transaction product 10 by consumers and/or recipients. At 332, transaction product 10 is placed on or hung from a rack, shelf or other similar device to display transaction product 10 for sale to potential consumers. In one embodiment, a depiction of transaction product 10 is placed on a web site for viewing and purchase by potential consumers. In one example, display of transaction product 10 includes advertising the inclusion of one or more articles 16, for example, the inclusion of a interlocking building bricks configured to be assembled into one or more characters or objects, within transaction product 10 to encourage consumer purchase of transaction product 10, for example, in the form of indicia 194, 196, 198, 200, 202, etc.

At 334, a consumer who has decided to purchase transaction product 10 presents transaction product 10 on backer 180 to a retail store employee, retail store kiosk, remote terminal or other person or device to scan account identifier 154 to access an account or record linked to account identifier 154. In particular, account identifier 154 is scanned or otherwise accessed, for example through opening 192 of backer 180 to activate transaction product 10, more particularly, transaction card 14 of transaction product 10. Upon accessing the account or record, then, at 336, value is added to the account or record in the form of monetary value, points, minutes, etc. Thus, transaction card 14 is activated and loaded.

In one example, a predetermined value is associated with transaction product 10 (i.e., associated with the account or record linked to transaction card 14 via account identifier 154) prior to activation and display, but such predetermined value is not initially available for use toward the purchase or use of goods and/or services. In such an embodiment, at 334, transaction card 14 is activated to permit subsequent access to the predetermined value (e.g., subsequent loading on and debiting from the account or record) and no additional value is added during activation such that operation 336 may be eliminated.

Once transaction card 14 is activated and loaded, transaction card 14 can be used by the consumer or any other bearer of transaction card 14 with or without housing 12 and/or one or more articles 16 to purchase goods and/or services from the retailer at the affiliated retail setting (e.g., a retail store or web site) or can be used in exchange for calling minutes, services, etc. In one embodiment, where transaction product 10 is displayed on a web site at 332, then, at 334, transaction card 14 may be activated in any suitable method and may not require the physical scanning of account identifier 154 to be activated or to otherwise access the associated account or record such as at 336.

In one example, at 338, the retailer accepts transaction card 14 as payment toward the purchase of goods and/or services made by the current bearer of transaction card 14. In particular, the value currently loaded on transaction card 14 (i.e., stored or recorded in the account or record linked to account identifier 154) is applied toward the purchase of goods and/or services. At 340, additional value is optionally loaded on transaction card 14 at a point-of-sale terminal, kiosk or other area of the retail store, retail web site, or other related setting.

Upon accepting transaction card 14 as payment at 338, the retail store or related setting can subsequently perform either operation 338 again or operation 340 as requested by a current bearer of transaction card 14. Similarly, upon loading additional value on transaction card 14 at 340, the retail store or related setting can subsequently perform either operation 340 again or operation 338. In one example, the ability to accept transaction card 14 as payment for goods and/or services is limited by whether the account or record associated with transaction card 14 has any value stored or recorded therein at the time of attempted redemption.

Figure 17:
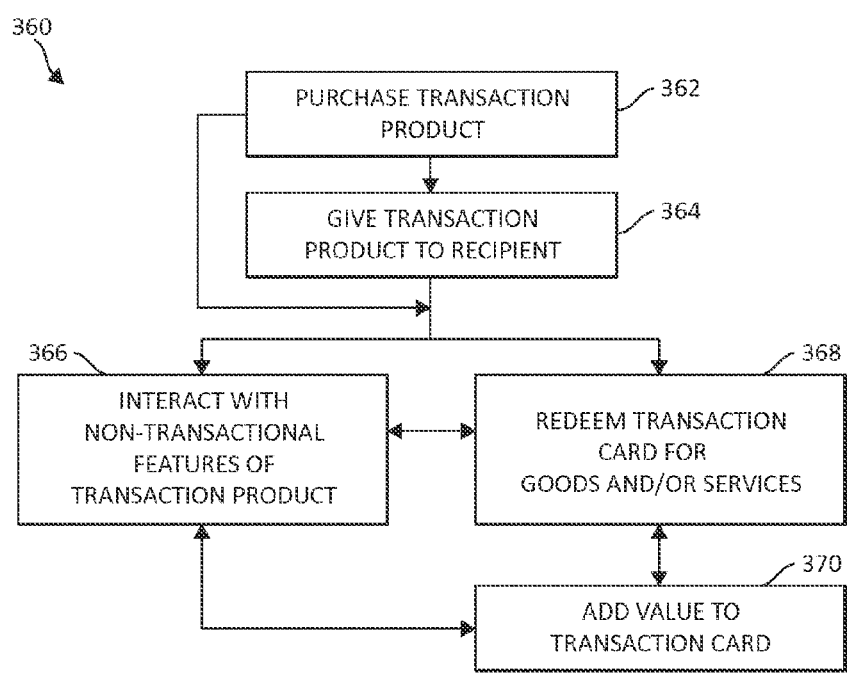
FIG. 17 is a flow chart illustrating a method of using a transaction product, according to one embodiment of the present invention.

FIG. 17 is a flow chart illustrating one embodiment of a method 360 of using transaction product 10 (e.g., FIGS. 1-9). At 362, a potential consumer of transaction product 10, which is displayed in a retail store or viewed on a web site, decides to and does purchase transaction product 10 from the retail store or web site. It should be understood that transaction product 10 can be displayed and purchased alone or as part of transaction product assembly 186 (e.g., FIGS. 13 and 14) along with backer 180.

Upon purchasing transaction product 10, a retail store employee, a retail store kiosk or other person or device scans account identifier 154 (e.g., FIGS. 2, 3, and 14), for example, through opening 192 of backer 180 or otherwise reads or accesses account identifier 154. Upon accessing account identifier 154, the account or record linked to account identifier 154 is accessed and activated to load value onto transaction product 10 (i.e., load value to the account or record associated with transaction product 10). In one embodiment, such as where transaction product 10 is purchased at 362 via a web site, actual scanning or other mechanical detection of account identifier 154 may be eliminated and/or manual input of code 22 may be added.

At 364, the consumer optionally gives transaction product 10 to a recipient, such as a graduate, relative, friend, expectant parents, one having a recent or impending birthday, a couple having a recent or impending anniversary, etc. In one embodiment, a plurality of transaction products 10 are purchased and given to party goers, such as at a birthday party, etc. as party favors or gifts. As an alternative, the consumer can keep transaction product 10 for his or her own use thereby eliminating operation 364.

At 366, the consumer, recipient or other current bearer of transaction product 10 interacts with transaction product 10. In one embodiment, playing or otherwise interacting with transaction product 10 at 366 includes opening housing 12, for example, by moving cover 22 partially away from base 20, for example, by rotating cover 22 away from base 20. Once uncoupled, storage chamber 38 of base 20 and the one or more articles 16 stored therein are accessible. As such, the one or more articles 16 and/or any bag 170, etc. are removed from storage chamber 38 to allow a bearer to play or remove the one or more articles 16 from bag 170 and interact with the one or more articles 16. For instance, where the one or more articles 16 include interlocking building bricks, the bearer removes the interlocking building bricks from bag 170 and uses the interlocking building bricks to form structures according to instruction sheet 172 and/or their own imagination. In one example, interlocking building bricks can be used to build something as soon as they are removed from housing 12, during or after using the transactional features of transaction product 10 and transaction card 14. Other articles 16 and interaction therewith will also be apparent to those of skill in the art upon reading the present application.

Following playing with the one or more articles 16 at 366, the one or more articles 16 may be replaced within storage chamber 38. Cover 22 is rotated back to cover opening 42 of base 20 and to cover storage chamber 38 and the one or more articles 16 therein. In one example, for instance, where the one or more articles 16 are consumables or are stored elsewhere following bearer interaction therewith, housing 12 may be used to store other small items owned by the bearer of transaction product 10 as will be apparent to one of skill in the art upon reading this application.

At 368, the consumer or recipient redeems transaction product 10 with transaction card 14 or transaction card 14 alone following its removal from housing 12 for goods and/or services, for example, from the retail store or web site. At 370, the consumer or recipient of transaction card 14 optionally adds value to transaction card 14, more particularly, to the remotely, database stored account or record associated with account identifier 154 included therewith, at the retail store or over the Internet (i.e., via the web site). Upon playing with transaction product 10 at 366, redeeming transaction card 14 at 368 or adding value to transaction card 14 at 370, the consumer or recipient of transaction product 10 subsequently can perform either of operations 366, 368 or 370 as desired. In one example, operation 366 and one or more of operations 368 and 370 can be performed substantially simultaneously wherein only the one or more articles 16 are used at 366 and/or wherein only transaction card 14 is used at 368 and/or 370. In one example, transaction card 14 alone or coupled with housing 12 can be used toward a purchase price even after one or more articles 16 are removed from housing 12. In one embodiment, the ability of the consumer or recipient to repeat redeeming transaction card 14 at 370 is limited by whether the account or record linked with transaction card 14 has any remaining value stored or recorded therein at the time of attempted redemption.

Although primarily described above as occurring at a single retail store or web site, in one embodiment, purchasing transaction product 10 at 362, redeeming transaction card 14 at 368 and adding value to transaction product 10 at 370, can each be performed at any one of a number of stores adapted to accept transaction product 10 or over the Internet. In one example, each of the number of stores is part of a chain or a group of similarly branded stores. In one example, a number of stores include at least one web site and/or at least one conventional brick and mortar store.

Transaction products come in many forms, according to embodiments of the invention. The gift card, like other transaction products, can be "re-charged" or "re-loaded" at the direction of the original consumer, the gift recipient or a third party. The term "loading on" or "loaded on" herein should be interpreted to include adding to the value or balance of an account or record associated with a transaction product. The balance associated with the transaction product declines as the transaction product is used, encouraging repeat visits or use. The transaction product remains in the user's purse or wallet, serving as an advertisement or a reminder to revisit the associated merchant. Gift cards according to embodiments of the invention provide a number of advantages to both the consumer and the merchant. Other transaction products according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are for illustrative purposes only and should not be considered to limit the invention. Various alternatives and other modifications within the scope of the invention in its various embodiments will be apparent to those of ordinary skill.

What is claimed is:

1. A transaction product, comprising:
a housing defining a storage chamber and a substantially planar surface, the substantially planar surface defining a perimeter portion and a recessed portion surrounded by, spaced from, and extending substantially parallel to the recessed portion to define a recess, wherein the housing includes opposing tabs extending from the perimeter portion, toward each other, and partially across the recessed portion; and
a transaction card including a machine-readable account identifier linking the transaction card to an account or record remote from the transaction product and having a value available for use as payment toward a purchase, wherein the transaction card defines two opposing edges each selectively secured between the recessed portion of the substantially planar surface and a different one of the opposing tabs.

2. The transaction product of claim 1, wherein the account identifier is a bar code connected to the housing.

3. The transaction product of claim 1, wherein the account identifier includes at least one of a bar code, a magnetic strip, a smart chip and a radio frequency identification (RFID) device.

4. The transaction product of claim 1, in combination with a database remote from the transaction product and storing the account or record.

5. The transaction product of claim 1, wherein the substantially planar surface is an exterior surface and faces away from the storage chamber.

6. The transaction product of claim 1, further comprising one or more articles maintained within the storage chamber.

7. The transaction product of claim 1, wherein the transaction card is substantially planar, defines an exposed substantially planar surface facing away from the housing, and the exposed substantially planar surface includes the account identifier.

8. The transaction product of claim 7, wherein the housing includes a transitional edge extending between the recessed portion and the perimeter portion, having a thickness at least equal to a thickness of the transaction card, and defining outer boundaries of the recess such that the exposed substantially planar surface of the transaction card is maintained offset from the perimeter portion of the substantially planar surface toward the recessed portion of the substantially planar surface.

9. The transaction product of claim 8, wherein the transitional edge is shaped substantially identically to and is sized slightly larger than an outer perimeter of the transaction card.

10. The transaction product of claim 9, wherein the transaction card can only be placed in the recess between the opposing tabs and the recessed portion by flexing the card away from the recessed portion of the housing.

11. The transaction product of claim 1, wherein the housing includes a first member and a second member formed separately from the first member and configured to move relative to one another to transition the housing between an open position, in which the storage chamber is accessible, and a closed position, in which the storage chamber is fully enclosed.

12. The transaction product of claim 1, wherein the housing includes a base molded as a single piece of material, and the base defines the substantially planar surface and the opposing tabs.

13. The transaction product of claim 12, wherein the base defines the storage chamber.

14. The transaction product of claim 1, wherein the substantially planar surface of the housing further defines an extension of the recessed portion extending beyond an edge of the transaction card and configured to provide a bearer finger access to a surface of the transaction card adjacent the recessed portion.

15. The transaction product of claim 1, in combination with a backer formed separately from and supporting the transaction product, the backer including a window providing direct access to the machine-readable account identifier of the transaction card through the backer while the backer supports the transaction product.

16. The transaction product of claim 1, wherein the housing is formed of one or more materials that are each one of translucent and transparent.

17. The transaction product of claim 1, wherein an outermost surface of the opposing tabs is coplanar with the perimeter portion of the substantially planar surface.

18. A stored-value product comprising:
a stored-value card including means for linking the stored-value card with at least one of an account and a record having a value associated therewith such that the stored-value card can be used as payment toward a purchase of one or more of goods and services, the stored-value card defining two opposing outer edges; and
means for storing one or more articles, wherein the means for storing defines a wall, and the wall includes:
an outermost surface,
a recess extending inwardly from the outermost surface toward the one or more articles, wherein the recess has an outer perimeter shaped substantially identically to and sized just larger than the stored-value card, and
means for selectively retaining only the two opposing outer edges of the stored-value card to maintain the stored-value card in the recess and inwardly offset from the outermost surface.

19. The stored-value product of claim 18, wherein the means for retaining includes an outermost surface extending coplanar with the outermost surface of the wall.

20. The stored-value product of claim 18, wherein the means for storing one or more articles is configured to open and close to provide selective access to the one or more articles.

21. The stored-value product of claim 20, in combination with the one or more articles.

22. The stored-value product of claim 18, wherein the stored-value card can only be placed in the recess by bending a portion of the stored-value card away from the recess.

23. A method of assembling a financial product, the method comprising:
placing a first edge of a substantially planar financial transaction card in a recess between a first retaining flange and a recessed surface formed by an enclosure, wherein:
the recessed surface partially defines bounds of the recess,
the first retaining flange extends partially across the recess, and
the substantially planar financial transaction card includes an account identifier linking the substantially planar financial transaction card to a remote account having a monetary balance available for use toward a price of a retail purchase;
flexing the substantially planar financial transaction card and, while the substantially planar financial transaction card is flexed, placing a second edge of the substantially planar financial transaction card within the recess between the recessed surface and a second retaining flange, wherein the second edge of the substantially planar financial transaction card is opposite the first edge of the substantially planar financial transaction card, and the second retaining flange extends partially across the recess and is positioned opposite the first retaining flange; and
allowing the substantially planar financial transaction card to unflex such that the second edge of the substantially planar financial transaction card moves further between the recessed surface and the second retaining flange such that the substantially planar financial transaction card is selectively secured in the recess.

24. The method of claim 23, further comprising placing one or more objects into the enclosure.

25. The method of claim 23, further comprising placing a finger in an extended portion of the recess to interact with a surface of the substantially planar financial transaction card adjacent the recessed surface to flex the substantially planar financial transaction card and remove the substantially planar financial transaction card from the recess.

* * * * *

UNITED STATES PATENT AND TRADEMARK OFFICE
CERTIFICATE OF CORRECTION

| | | |
|---|---|---|
| PATENT NO. | : 8,434,680 B1 | Page 1 of 1 |
| APPLICATION NO. | : 13/290044 | |
| DATED | : May 7, 2013 | |
| INVENTOR(S) | : Mark A. Schultz et al. | |

It is certified that error appears in the above-identified patent and that said Letters Patent is hereby corrected as shown below:

In the Claims

Claim 1, Col. 14

Line Item [4], delete "recessed" and insert --perimeter--.

Signed and Sealed this
Twenty-first Day of October, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,434,680 B1 | Page 1 of 1 |
| APPLICATION NO. | : 13/290044 | |
| DATED | : May 7, 2013 | |
| INVENTOR(S) | : Mark A. Schultz et al. | |

It is certified that error appears in the above-identified patent and that said Letters Patent is hereby corrected as shown below:

In the Claims

Claim 1, Col. 14

Line Item 5, delete "recessed" and insert --perimeter--.

This certificate supersedes the Certificate of Correction issued October 21, 2014.

Signed and Sealed this
Eleventh Day of November, 2014

Michelle K. Lee
*Deputy Director of the United States Patent and Trademark Office*